United States Patent [19]

Horio et al.

[11] Patent Number: 5,653,785

[45] Date of Patent: Aug. 5, 1997

[54] METHOD FOR SEPARATION OF NITROGEN AND CARBON DIOXIDE BY USE OF CERAMIC MATERIALS AS SEPARATING AGENT

[75] Inventors: Masakazu Horio, Konan; Kenzi Suzuki, Aichi-ken; Toshiaki Mori, Yokkaichi; Keiichi Inukai; Shinji Tomura, both of Nagoya, all of Japan

[73] Assignee: Agency of Industrial Science & Technology, Ministry of International Trade & Industry, Tokyo, Japan

[21] Appl. No.: 653,999

[22] Filed: May 28, 1996

Related U.S. Application Data

[63] Continuation of Ser. No. 339,238, Nov. 10, 1994, abandoned.

[30] Foreign Application Priority Data

Nov. 10, 1993 [JP] Japan .................................. 5-305933
Nov. 10, 1993 [JP] Japan .................................. 5-305934

[51] Int. Cl.$^6$ .................................................... B01D 53/04
[52] U.S. Cl. ............................ 95/139; 95/902; 423/230
[58] Field of Search ........................... 95/130, 139, 900, 95/902; 423/230

[56] References Cited

U.S. PATENT DOCUMENTS

| | | | |
|---|---|---|---|
| 3,751,878 | 8/1973 | Collins | 95/139 X |
| 4,775,396 | 10/1988 | Rastelli et al. | 95/139 X |
| 5,186,727 | 2/1993 | Chang | 95/139 X |

FOREIGN PATENT DOCUMENTS

| | | | |
|---|---|---|---|
| 0083832 | 7/1983 | European Pat. Off. | 95/139 |
| 0 124 737 | 11/1984 | European Pat. Off. | |
| 61-255995 | 11/1986 | Japan | 95/139 |
| 2-075318 | 3/1990 | Japan | 95/139 |
| 0552102 | 4/1977 | U.S.S.R. | 95/139 |
| 0679228 | 8/1979 | U.S.S.R. | 95/139 |
| 2252968 | 8/1992 | United Kingdom. | |

OTHER PUBLICATIONS

K. Brauner, et al., "Struktur und Entstehung des Sepioliths", Mineral, Petro. Mitt., vol. 6, pp. 120–140, 1956.

Ryohei Otsuka, et al., "Occurrances and Mineralogical Properties of Sepiolite", Nendo Kagaku, vol. 32, No. 3, pp. 154–172, 1992.

Yoshiaki Fukushima, et al. "Absorption and Catalytic Properties of Sepiolite", Nendo Kagaku, vol. 32, No. 3, pp. 177–183, 1992.

Toshie Kitayama, et al., Nihon Kagaku Kaishi, The Chemical Society of Japan, No. 11, pp. 1824–1829, 1989.

Hiroshi Nagata, et al., "On Dehydration of Bound Water of Sepiolite", Clays and Clay Minerals, vol. 22, pp. 285–293, 1974.

Database WPI, Derwent Publications Ltd., AN 92–092760, Patent Abstracts of Japan, vol. 16, No. 202 (C–0940), May 14, 1992 of JP-A-04 035 739, Feb. 6, 1992.

Database WPI, Derwent Publications Ltd., An 92–070126, Patent Abstracts of Japan, vol. 16, No. 168 (C–0932), Apr. 22, 1992 of JP-A-04 016 236, Jan. 21, 1992.

Database WPI, Derwent Publications Ltd., AN 91–263915, JP-A-03 174 090, Jul. 29, 1991.

Journal of Chromatography, vol. 77, 1973, pp. 109–118, G. Manara, et al., "Selective Adsorption Properties of the Surfaces of Attapulgite and Sepiolite".

*Primary Examiner*—Robert Spitzer
*Attorney, Agent, or Firm*—Oblon, Spivak, McClelland, Maier & Neustadt, P.C.

[57] ABSTRACT

Separation of nitrogen and carbon dioxide is accomplished by a method using as a separating material one member selected from the group consisting of sepiolite in the unmodified form, sepiolite which has been heat-treated, and sepiolite which has had part or the whole of the exchangeable cation thereof replaced with zinc ion and which has been subsequently subjected to a heat treatment.

5 Claims, 2 Drawing Sheets

METHOD FOR SEPARATION OF NITROGEN AND CARBON DIOXIDE BY USE OF CERAMIC MATERIALS AS SEPARATING AGENT

This application is a Continuation of application Ser. No. 08/339,238, filed on Nov. 10, 1994, now abandoned.

BACKGROUND OF THE INVENTION

1. Field of the Invention

Global warming has become a serious social issue. Since the carbon dioxide produced by the burning of fossil fuels at factories etc. is believed to be one of the main causes of this problem, it is necessary to develop technologies for recovering the carbon dioxide already discharged into the atmosphere and fixing the recovered carbon dioxide or for separating and recovering the carbon dioxide present at high concentration and high temperature in exhaust gases. Organic separating materials cannot be used for the separation and recovery of hot carbon dioxide because they are not sufficiently resistant to heat. Thus, ceramic materials, which are thermally stable by nature, are potential candidates for the separating material. This invention provides a method for the separation of nitrogen and carbon dioxide by the use of sepiolite, a clayish mineral, and is believed to be capable of contributing immensely to the preservation of the global environment.

2. Description of the Prior Art

No ceramic separating material has been proposed to date for use in the separation and recovery of high-temperature carbon dioxide entrained by the exhaust gas from a factory or the like.

SUMMARY OF THE INVENTION

The development of a thermally stable ceramic material for the separation of nitrogen and carbon dioxide contained in hot exhaust gases produced at stationary sources such as factories has become an urgent necessity in many industries.

This invention provides a method for the separation of nitrogen and carbon dioxide at elevated temperatures by the use of a ceramic material.

To be specific, this invention is directed to a method for the separation of nitrogen and carbon dioxide by the use as a separating material of at least one ceramic material selected from the group consisting of sepiolite in its unmodified form, sepiolite which has been heat-treated at a temperature in the range of from 200° to 800° C., and sepiolite which has had at least part of the exchangeable cation thereof replaced by zinc ion and which has then been heat-treated at a temperature of not higher than 800° C. and not lower than 400° C.

The above and other features of the invention will become apparent from the following description made with reference to the accompanying drawings.

DESCRIPTION OF THE PREFERRED EMBODIMENTS

This invention resides in providing a method for the separation of nitrogen and carbon dioxide entrained at elevated temperatures in an exhaust gas by the use of a ceramic separating material. Since nitrogen and carbon dioxide have substantially equal molecular diameters, it is extremely difficult to separate them by the molecular sieve effect. Thus, they are required to be separated by a method other than the molecular sieving method. Comparison of nitrogen and carbon dioxide in terms of chemical properties shows that carbon dioxide is an acid gas and is adsorbed at basic sites, whereas nitrogen is not adsorbed at either acidic sites or basic sites. This difference leads to the idea of separating nitrogen and carbon dioxide by utilizing the adsorption and desorption of the two gases caused by a ceramic material.

Figure 1:
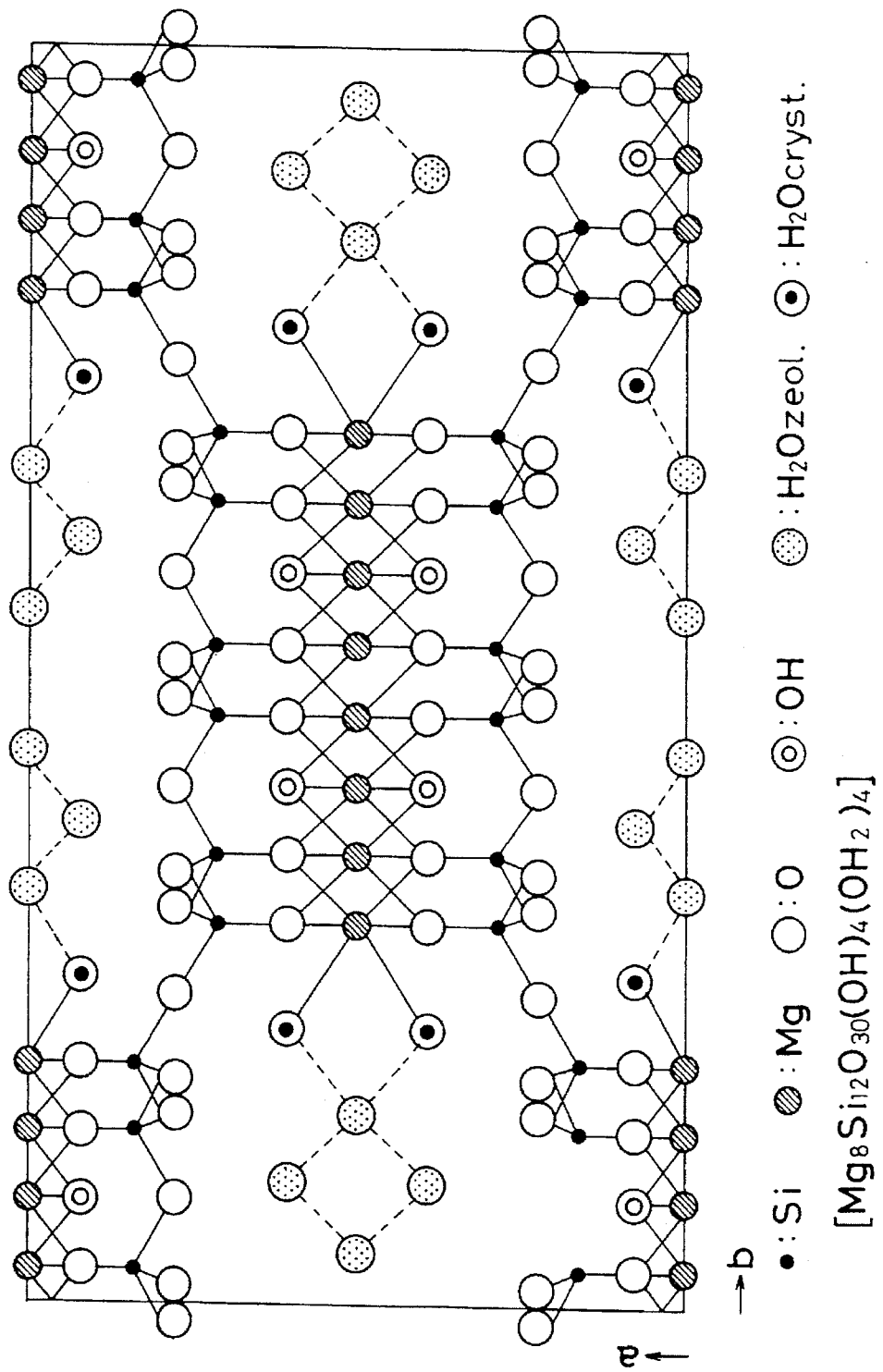
FIG. 1 is a projection in the ab plane of a crystal model of sepiolite.

The ceramic separating material used in the method of this invention is sepiolite, a type of clayish mineral, sepiolite which has undergone a heat treatment at a temperature in the range of from 100° C. to 800° C., or sepiolite which has undergone first an ion-exchange treatment with a zinc ion and then a heat treatment at a temperature of not higher than 800° C. Sepiolite will now be explained. FIG. 1 is a projection in the ab plane of a crystal structure model of $Mg_8Si_{12}O_{30}(OH)_4(OH_2)_4$ [Brauner, K. and Preisinger, A., Miner. Petro. Mitt., Vol. 6, pp. 120–140 (1956)]. In the diagram, ● denotes an Si atom, ⊘ an Mg atom, ○ an O atom, ⊙ an OH group, ⊕ an $H_2O$ zeol., and ⊙ an $H_2O$ cryst. Since sepiolite assumes a fibrous form extending in the direction perpendicular to the ab plane shown in FIG. 1, namely in the direction of the c axis, FIG. 1 depicts a cross section of a sepiolite fiber. This structure is what results from reversing the direction of the apex of an Si—O tetrahedral sheet of a 2:1 type layer resembling talc at a period of about 13.4 Angstroms. The crystal structure of sepiolite is characterized by the presence therein of channels, i.e. micropores with a cross-sectional area of about 13.4 Angstroms×6.7 Angstroms, due to the superposition of 2:1 type layers in the pattern of a zigzag lattice. In the channels, zeolitic water, exchangeable cation, and water molecules positioned at the Mg atoms of the octahedral layers of the 2:1 type layer are present [Ryohei Otsuka, Yu Shimoda, Koya Shimosaka, Hiroshi Nagata, Yasushi Shinohara, Masahiro Shimizu, and Naofumi Sakamoto: Nendo Kagaku, Vol. 32, No. 3, pp. 154 to 172 (1992)]. When heated, sepiolite starts dehydrating and then succumbs to a structural change due to the dehydration. A study of the thermogravimetric curve of sepiolite shows that the decrease of weight due to dehydration occurs in the four steps: at temperatures of not higher than 100° C. (Step 1), at temperatures in the range of from 200° to 350° C. (Step 2), at temperatures in the range of from 400° to 600° C. (Step 3), and at temperatures in the range of from 750° to 820° C. (Step 4). Further, in the differential thermal analysis curve, endothermic curves are found at points corresponding to the steps of weight decrease and a sharp exothermic peak is found in the neighborhood of 830° C. The decrease of weight at Step 1 is due to the release of adsorbed water and zeolitic water, those at Step 2 and Step 3 are each due to the release of one half of the volume of the bound water, and that at Step 4 is due to the release of the structural water. The exothermic peak in the neighborhood of 830° C. is due to the transformation of sepiolite to enstatite. The dehydration behaviors at the respective steps are represented by the following compositional formulas.

Step 1: 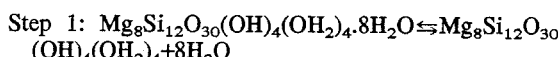

Step 2: 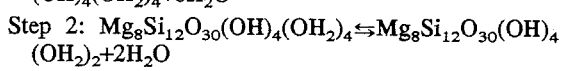

Step 3: $Mg_8Si_{12}O_{30}(OH)_4(OH_2)_2 \rightarrow Mg_8Si_{12}O_{30}(OH)_4 + 2H_2O$ Step 4: $Mg_8Si_{12}O_{30}(OH)_4 \rightarrow Mg_8Si_{12}O_{30} + 2H_2O$ When sepiolite in a dry state is held at a temperature of not lower than about 400° C., a phenomenon called a folding ensues and the 2:1 type layer is rotated and transformed into a folded structure. The temperature at which the folding occurs differs between sepiolites from different regions. There are times when folding takes place even at 200° C.

Sepiolite has three kinds of surfaces, as shown in FIG. 1. One is the oxygen surface of the tetrahedral sheet, which is similar to the surface of ordinary phyllosilicate. This surface has virtually no activity and functions as a surface for physical adsorption. The second is the group of —Si—OH which exists only on the outer surface severed from bondage and resembles the surface of silica gel. The last is the surface on which Mg atoms on the channel surfaces or water molecules bound thereto are present. This is a surface in the same state as the surface which would exist at the ends of crystals of phyllosilicate. In sepiolite, this surface is present at countless sites along the channels. The fact that countless active sites exist in sepiolite gives sepiolite characteristic features not found in any other minerals [Yoshiaki Fukushima, Toshie Kitayama, and Kazuo Urabe: Nendo Kagaku, Vol. 32, No. 3, pp. 177 to 183 (1992)].

The method for the preparation of a zinc ion-exchanged sepiolite for use in this invention will now be described. Twenty (20) ml of an aqueous 0.5M zinc nitrate solution and 5.0 g of sepiolite added thereto are thoroughly stirred and the resultant mixture is left standing at room temperature for 24 hours. The concentration and the volume of the aqueous zinc nitrate solution are so selected that at least part, preferably all, of the exchangeable ion of the sepiolite may undergo ion exchange. After the ion exchange, the reaction mixture is centrifuged or filtered to separate sepiolite. Then, the separated sepiolite is washed with water, dried, and then is heat treated at a temperature of not higher than 800° C., preferably higher than 250° C., for two hours. The steps of washing with water and drying may be omitted. The conditions for heating sepiolite which are fixed by the heating temperature and the heating time may be selected suitably within the ranges in which the transformation of sepiolite to enstatite does not occur.

The method of this invention uses sepiolite in its unmodified form, sepiolite which has undergone a heat treatment, or sepiolite which has had part or all of the exchangeable ions thereof exchanged by zinc ions and which has been subsequently heat-treated at a temperature of not higher than 800° C. as a separating material.

The characteristics of each of the aforementioned three types of sepiolite as a separating material will be understood from the working examples set out below. The characteristics of other types of sepiolite produced by further treatments will now be described.

1) In the case of the heat-treated sepiolite, any organic substances originally contained in the sepiolite will be removed by the heat treatment, precluding the possibility of the sepiolite having its ability to adsorb carbon dioxide degraded.

2) In the case of the sepiolite having undergone ion exchange by zinc ion, the sepiolite is enabled to introduce basic sites in consequence of the ion exchange by zinc ion [Toshie Kitayama and Akira Abe: Nihon Kagaku Kaishi, No. 11, pp. 1824 to 1829 (1989)]. Thus, this sepiolite is believed to be effective in adsorbing carbon dioxide, which is an acid gas.

The method for testing a ceramic material for the ability to separate nitrogen and carbon dioxide will be now described. When a ceramic material is exposed to nitrogen or carbon dioxide, the gas is adsorbed on the surface of the ceramic material and, after a while, is desorbed therefrom. This adsorption occurs both physically and chemically when the temperature of the ceramic material is low. When the temperature rises, the adsorption begins to occur exclusively chemically. In other words, the physical adsorption is weak and the chemical adsorption is strong in terms of the intensity of adhesion. The "retention time", namely the interval between the time the gas is adsorbed on the surface of the ceramic material and the time the gas is desorbed therefrom, is greatly affected by the ability of the gas to adsorb on and desorb from the ceramic material. The fact that the retention time of a gas on a ceramic material is long means that the gas is strongly adsorbed on the surface of the ceramic material and is not easily desorbed therefrom. The fact that the retention time is short implies that the interaction between the gas and the surface of the ceramic material is so weak as to allow ready desorption of the gas from the surface of the ceramic material. From this it follows that the ability of a ceramic material to separate nitrogen and carbon dioxide is greater in proportion as the difference between its nitrogen and carbon dioxide retention times is larger. The retention time can be determined by any method capable of measuring the interval between the time a given gas is adsorbed on the object and the gas is desorbed therefrom. It can be obtained simply by the use of a gas chromatograph with TCD using helium as a carrier gas.

Figure 2:
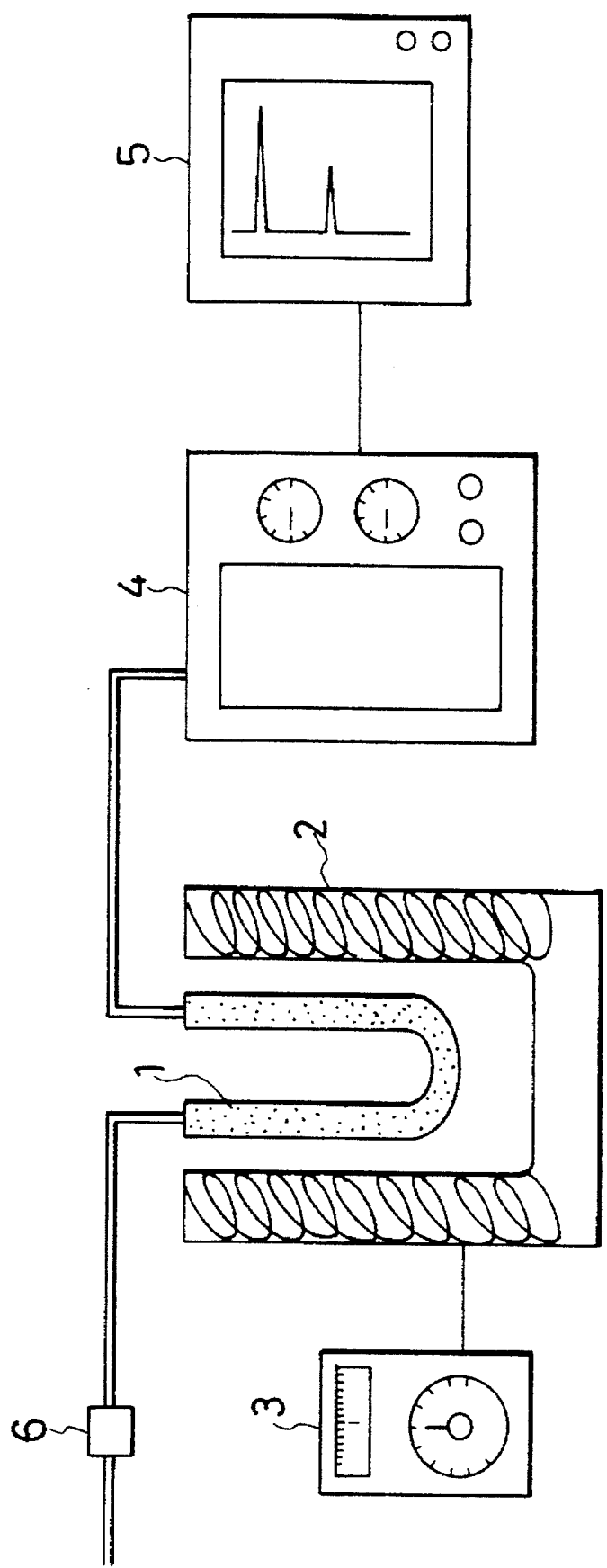
FIG. 2 is a diagram illustrating a measuring device for use in evaluating the ability of a separating material to separate nitrogen and carbon dioxide.

A measuring device for testing a ceramic material for the ability to separate nitrogen and carbon dioxide will now be explained with reference to FIG. 2. This measuring device is composed of a sample packing column 1, a heating furnace 2, a temperature controlling unit 3, a gas chromatography unit 4, a pen recorder 5, and a nitrogen/carbon dioxide inlet 6. The measurement is started by packing 5.0 g of the separating material to be tested in the sample packing column 1, which is a pipe of stainless steel about 1 meter in length. Then, the separating material in the column is calcined at a temperature in the range of from 100° C. to 800° C. for one to two hours as held in a stream of helium passed at a flow volume of 20 ml/min as a carrier gas. Subsequently, the sample is adjusted to a prescribed measuring temperature, 2 ml of a mixed gas of nitrogen and carbon dioxide is injected into the column through the nitrogen/carbon dioxide inlet with the aid of a microsyringe, and the pen recorder 5 is actuated to start recording. The retention times of nitrogen and carbon dioxide are thus determined and the difference between them calculated. The ability of the separating material under test to separate nitrogen and carbon dioxide is rated based on this difference.

The method of this invention, as demonstrated in the working examples and comparative examples set out below, effects highly efficient separation of nitrogen and carbon dioxide and has the potential to contribute immensely to the preservation of the environment. The experiments involved in the working examples and the comparative examples were carried out by the use of the measuring device illustrated in FIG. 2.

EXAMPLE 1

In a sample packing column, 5.0 g of sepiolite was packed and calcined at 300° C. for two hours as held in a stream of helium passed at a flow volume of 20 ml/min. After the calcination, the temperature of the sample (the separation temperature) was adjusted 120° C. and 2 ml of the nitrogen-carbon dioxide mixed gas was injected into the column. The retention time of nitrogen was 25 seconds and that of carbon dioxide 221 seconds. The difference was 196 seconds.

EXAMPLE 2

The retention time of nitrogen and that of carbon dioxide were measured by following the procedure of Example 1 except that the separation temperature was changed to 180° C. The results were 23 seconds and 62 seconds respectively. The difference was 39 seconds.

EXAMPLE 3

The retention time of nitrogen and that of carbon dioxide were measured by following the procedure of Example 1 except that the separation temperature was changed to 220° C. The results were 22 seconds and 37 seconds respectively. The difference was 15 seconds.

EXAMPLE 4

In a sample packing column, 5.0 g of sepiolite was packed and calcined at 500° C. for two hours as held in a stream of helium passed at a flow volume of 20 ml/min. After the calcination, the separation temperature was adjusted to 200° C. and 2 ml of the nitrogen-carbon dioxide mixed gas was injected into the column. The retention time of nitrogen was 48 seconds and that of carbon dioxide 183 seconds. The difference was 135 seconds.

EXAMPLE 5

The retention time of nitrogen and that of carbon dioxide were measured by following the procedure of Example 4 except that the separation temperature was changed to 300° C. The results were 46 seconds and 61 seconds respectively. The difference was 15 seconds.

EXAMPLE 6

In a sample packing column, 5.0 g of sepiolite which had been heat-treated at 500° C. for two hours was packed and calcined at 300° C. for two hours as held in a stream of helium passed at a flow volume of 20 ml/min. After the calcination, the separation temperature was adjusted to 200° C. and 2 ml of the nitrogen-carbon dioxide mixed gas was injected into the column. The retention time of nitrogen was 22 seconds and that of carbon dioxide 174 seconds. The difference was 152 seconds.

EXAMPLE 7

The retention time of nitrogen and that of carbon dioxide were measured by following the procedure of Example 6 except that the separation temperature was changed to 300° C. The results were 20 seconds and 36 seconds respectively. The difference was 16 seconds.

EXAMPLE 8

In a sample packing column, 5.0 g of sepiolite which had been heat-treated at 600° C. for two hours was packed and calcined at 300° C. for two hours as held in a stream of helium passed at a flow volume of 20 ml/min. After the calcination, the separation temperature was adjusted to 180° C. and 2 ml of the nitrogen-carbon dioxide mixed gas was injected into the column. The retention time of nitrogen was 23 seconds and that of carbon dioxide 302 seconds. The difference was 279 seconds.

EXAMPLE 9

The retention time of nitrogen and that of carbon dioxide were measured by following the procedure of Example 8 except that the separation temperature was changed to 220° C. The results were 22 seconds and 110 seconds respectively. The difference was 88 seconds.

EXAMPLE 10

The retention time of nitrogen and that of carbon dioxide were measured by following the procedure of Example 8 except that the separation temperature was changed to 280° C. The results were 21 seconds and 44 seconds respectively. The difference was 23 seconds.

EXAMPLE 11

In a sample packing column, 5.0 g of sepiolite which had been heat-treated at 800° C. for two hours was packed and calcined at 300° C. for two hours as held in a stream of helium passed at a flow volume of 20 ml/min. After the calcination, the separation temperature was adjusted to 200° C. and 2 ml of the nitrogen-carbon dioxide mixed gas was injected into the column. The retention time of nitrogen was 23 seconds and that of carbon dioxide was 83 seconds. The difference was 60 seconds.

EXAMPLE 12

The retention time of nitrogen and that of carbon dioxide were measured by following the procedure of Example 11 except that the separation temperature was changed to 300° C. The results were 21 seconds and 39 seconds respectively. The difference was 18 seconds.

EXAMPLE 13

In a sample packing column, 5.0 g of sepiolite which had been heat-treated at 500° C. for two hours was packed and calcined at 600° C. for two hours as held in a stream of helium passed at a flow volume of 20 ml/min. After the calcination, the separation temperature was adjusted to 180° C. and 2 ml of the nitrogen-carbon dioxide mixed gas was injected into the column. The retention time of nitrogen was 48 seconds and that of carbon dioxide was 330 seconds. The difference was 282 seconds.

EXAMPLE 14

The retention time of nitrogen and that of carbon dioxide were measured by following the procedure of Example 13 except that the separation temperature was changed to 300° C. The results were 45 seconds and 62 seconds respectively. The difference was 17 seconds.

COMPARATIVE EXAMPLE 1

In a sample packing column, 5.0 g of silica gel was packed and calcined at 300° C. for two hours as held in a stream of helium passed at a flow volume of 20 ml/min. After the calcination, the separation temperature was adjusted to 120° C. and 2 ml of the nitrogen-carbon dioxide mixed gas was injected into the column. The retention time of nitrogen was 32 seconds and that of carbon dioxide 63 seconds. The difference was 31 seconds.

COMPARATIVE EXAMPLE 2

The retention time of nitrogen and that of carbon dioxide were measured by following the procedure of Comparative Example 1 except that the separation temperature was changed to 160° C. The results were 31 seconds and 47 seconds respectively. The difference was 16 seconds.

EXAMPLE 15

In a sample packing column, 5.0 g of sepiolite ion exchanged by zinc ion which had been heat-treated at 300°

C. for two hours in an electric furnace held in an atmosphere of air was packed and calcined at 300° C. for two hours as held in a stream of helium passed at a flow volume of 20 ml/min. After the calcination, the sample temperature (separation temperature) was adjusted to 120° C. and 2 ml of the nitrogen-carbon dioxide mixed gas was injected into the column. The retention time of nitrogen was 26 seconds and that of carbon dioxide was 343 seconds. The difference was 317 seconds.

EXAMPLE 16

The retention time of nitrogen and that of carbon dioxide were measured by following the procedure of Example 15 except that the separation temperature was changed to 200° C. The results were 23 seconds and 61 seconds respectively. The difference was 38 seconds.

EXAMPLE 17

The retention time of nitrogen and that of carbon dioxide were measured by following the procedure of Example 15 except that the separation temperature was changed to 220° C. The results were 22 seconds and 49 seconds respectively. The difference was 27 seconds.

EXAMPLE 18

In a sample packing column, 5.0 g of sepiolite ion exchanged by zinc ion which had been heat-treated at 500° C. for two hours in an electric furnace held in an atmosphere of air was packed and calcined at 350° C. for two hours as held in a stream of helium passed at a flow volume of 20 ml/min. After the calcination, the separation temperature was adjusted to 240° C. and 2 ml of the nitrogen-carbon dioxide mixed gas was injected into the column. The retention time of nitrogen was 22 seconds and that of carbon dioxide was 208 seconds. The difference was 186 seconds.

EXAMPLE 19

The retention time of nitrogen and that of carbon dioxide were measured by following the procedure of Example 18 except that the separation temperature was changed to 300° C. The results were 21 seconds and 70 seconds respectively. The difference was 49 seconds.

EXAMPLE 20

The retention time of nitrogen and that of carbon dioxide were measured by following the procedure of Example 18 except that the separation temperature was changed to 320° C. The results were 20 seconds and 55 seconds respectively. The difference was 35 seconds.

EXAMPLE 21

In a sample packing column, 5.0 g of sepiolite ion exchanged by zinc ion which had been heat-treated at 600° C. for two hours in an electric furnace held in an atmosphere of air was packed and calcined at 400° C. for two hours as held in a stream of helium passed at a flow volume of 20 ml/min. After the calcination, the separation temperature was adjusted to 280° C. and 2 ml of the nitrogen-carbon dioxide mixed gas was injected into the column. The retention time of nitrogen was 20 seconds and that of carbon dioxide was 155 seconds. The difference was 135 seconds.

EXAMPLE 22

The retention time of nitrogen and that of carbon dioxide were measured by following the procedure of Example 21 except that the separation temperature was changed to 300° C. The results were 20 seconds and 109 seconds respectively. The difference was 89 seconds.

EXAMPLE 23

The retention time of nitrogen and that of carbon dioxide were measured by following the procedure of Example 21 except that the separation temperature was changed to 360° C. The results were 20 seconds and 48 seconds respectively. The difference was 28 seconds.

EXAMPLE 24

In a sample packing column, 5.0 g of sepiolite ion-exchanged by zinc ion which had been heat-treated at 500° C. for two hours in an electric furnace held in an atmosphere of air was packed and calcined at 500° C. for two hours as held in a stream of helium passed at a flow volume of 20 ml/min. After the calcination, the separation temperature was adjusted to 240° C. and 2 ml of the nitrogen-carbon dioxide mixed gas was injected into the column. The retention time of nitrogen was 21 seconds and that of carbon dioxide was 207 seconds. The difference was 186 seconds.

EXAMPLE 25

In a sample packing column, 5.0 g of sepiolite ion exchanged by zinc ion which had been heat-treated at 500° C. for two hours in an electric furnace held in an atmosphere of air was packed and calcined at 600° C. for two hours as held in a stream of helium passed at a flow volume of 20 ml/min. After the calcination, the separation temperature was adjusted to 280° C. and 2 ml of the nitrogen-carbon dioxide mixed gas was injected into the column. The retention time of nitrogen was 20 seconds and that of carbon dioxide was 154 seconds. The difference was 134 seconds.

EXAMPLE 26

The retention time of nitrogen and that of carbon dioxide were measured by following the procedure of Example 25 except that the separation temperature was changed to 300° C. The results were 20 seconds and 108 seconds respectively. The difference was 88 seconds.

What is claimed is:

1. A method for the separation and recovery of carbon dioxide from a gas comprising nitrogen and carbon dioxide, comprising the steps of:
    a) adjusting the temperature of a packed column to an effective elevated separation temperature, said packed column having been packed with at least one ceramic material selected from the group consisting of:
        i) sepiolite which has been heat-treated at a temperature of between 300° C. and 800° C. directly before packing, and
        ii) sepiolite which has had at least part of the exchangeable cation thereof replaced by zinc ion and which has then been heat-treated at a temperature of between 250° C. and 800° C. directly before packing;
    b) passing said gas comprising nitrogen and carbon dioxide at said elevated separation temperature through said packed column,
        whereby nitrogen in said gas passes through said packed column faster than carbon dioxide passes through said packed column due to differential retention times for said nitrogen and carbon dioxide on said heat-treated sepiolite; and c) recovering carbon dioxide based on said retention time differential.

2. The method of claim 1, further comprising a first step, prior to said passing step, of calcining the packed column at a temperature of between 100° C. to 800° C.

3. The method of claim 1, wherein said elevated separation temperature is at least 120° C.

4. The method of claim 1, wherein said elevated separation temperature is between 120° C. and 360° C.

5. The method of claim 1, wherein said gas is an exhaust gas.

* * * * *